ent Number: 4,610,302

United States Patent [19]
Clark

[45] Date of Patent: Sep. 9, 1986

[54] OIL RECOVERY PROCESSES

[75] Inventor: J. Bennett Clark, Bartlesville, Okla.

[73] Assignee: Phillips Petroleum Company, Bartlesville, Okla.

[21] Appl. No.: 751,694

[22] Filed: Jul. 3, 1985

[51] Int. Cl.$^4$ .............................................. E21B 43/22
[52] U.S. Cl. ................................ 166/246; 166/273; 166/274
[58] Field of Search ................ 166/246, 273, 274

[56] References Cited

U.S. PATENT DOCUMENTS

| | | | |
|---|---|---|---|
| 2,413,278 | 12/1946 | Zobell | 195/1 |
| 2,641,566 | 6/1953 | Zobell | 195/3 |
| 3,032,472 | 5/1962 | Hitzman | 195/3 |
| 3,105,014 | 9/1963 | Harrison | 166/246 |
| 3,340,930 | 9/1967 | Hitzman | 166/246 |
| 3,469,630 | 9/1969 | Hurd et al. | 166/250 |
| 3,478,823 | 11/1969 | Murphy | 166/274 |
| 3,532,166 | 10/1970 | Williams | 166/274 |
| 3,777,817 | 12/1973 | Feuerbacher | 166/274 |
| 3,777,818 | 12/1973 | Feuerbacher | 166/274 |
| 3,788,399 | 1/1974 | Feuerbacher | 166/274 |
| 3,797,574 | 3/1974 | Feuerbacher | 166/274 |
| 3,804,173 | 4/1974 | Jennings | 166/275 |
| 4,005,749 | 2/1977 | Birk et al. | 166/273 |
| 4,006,779 | 2/1977 | Kalfoglou | 166/275 |
| 4,043,396 | 8/1977 | Kudchadker et al. | 166/274 |
| 4,072,192 | 2/1978 | Kudchadker et al. | 166/273 |
| 4,113,013 | 9/1978 | Ledoux | 166/275 |
| 4,133,385 | 1/1979 | Kalfoglou | 166/273 |
| 4,142,582 | 3/1979 | Kalfoglou | 166/273 |
| 4,147,214 | 4/1979 | Kalfoglou | 166/273 |
| 4,157,115 | 6/1979 | Kalfoglou | 166/274 |
| 4,172,497 | 10/1979 | Kalfoglou | 166/273 |
| 4,207,946 | 6/1980 | Haltmar | 166/274 |
| 4,217,958 | 8/1980 | Doster et al. | 166/274 |
| 4,219,082 | 8/1980 | Kalfoglou | 166/273 |
| 4,300,632 | 11/1981 | Wiberger et al. | 166/246 |
| 4,446,919 | 5/1984 | Hitzman | 166/273 |
| 4,475,590 | 10/1984 | Brown | 166/246 |

Primary Examiner—Stephen J. Novosad
Assistant Examiner—Bruce M. Kisliuk
Attorney, Agent, or Firm—Howard D. Doescher

[57] ABSTRACT

An enhanced oil recovery process comprising injecting into an oil-bearing formation a sacrificial agent to adsorb on and occupy active sites of the formation matrix and introducing into the formation microbial cells or agents which produce metabolic products in-situ thereby enhancing oil displacement from the formation.

14 Claims, No Drawings

OIL RECOVERY PROCESSES

BACKGROUND OF THE INVENTION

This invention relates to the recovery of natural fluids from subterranean reservoirs. More particularly, this invention relates to a process for recovering hydrocarbons from hydrocarbon-bearing formations. More specifically, this invention relates to post primary hydrocarbon recovery processes in which the formation is first treated with a sacrificial agent followed by injection of microbial agents.

The production of petroleum products is usually accomplished by drilling into a hydrocarbon bearing formation and utilizing one of the well known recovery methods for the recovery of hydrocarbons. However, it is recognized that these primary recovery techniques may recover only a minor portion of the petroleum present in the formation particularly when applied to reservoirs of viscous crudes. Even the use of improved recovery practices involving steam, surfactantflooding, waterflooding and polymerflooding can result in up to 50–60 percent of the original hydrocarbons being left in place.

Thus, many large reserves of petroleum fluids from which only small recoveries have been realized by present commercial recovery methods remain in place.

It is known that bacteria can be introduced into subterranean formations for the purpose of beneficially influencing the factors which control the quantity of valuable fluids which can be recovered from the formations or which control the facility with which such fluids are recoverable. Microbial cells have a strong surface charge and, therefore, are readily adsorbed by the rock surface and clay particles in porous media. Consequently, microbial cells are very difficult to transport through porous media because the microorganisms are readily adsorbed on the reservoir rock.

The positive but indirect manner by which in-situ bacterial cell metabolism enhances oil recovery depends on the successful positioning of such cells deep in the oil bearing formation. Once in position, cell metabolism can give rise, e.g., to gas production such as $CO_2$ or surfactant production such as carboxylic acids which can be beneficial to enhanced oil recovery operations. The positioning of bacterial cells in subterranean rock strata is hindered by the natural tendency of such cells to be strongly adsorbed on the rock surface. This adsorption prevents the facile injection of the cells and severe plugging of the rock matrix results at a short distance from the injection site. The present invention proposes the use of known sacrificial agents to facilitate the injection and thus the successful positioning of bacterial cells deep in the rock strata, i.e., at a great distance from the site of bacterial cell injection. It is contemplated that the sacrificial agent, usually as an aqueous solution, can be injected prior to the injection of the bacterial cells or simultaneously with the bacterial cells.

The general use of sacrificial agents in the prior art to diminish the adsorption of subsequently or simultaneously injected surfactants and/or polymers in enhanced oil recovery operations is disclosed, e.g., in patents such as U.S. Pat. Nos. 3,532,166; 3,469,630; 3,478,823; 4,157,115; 4,217,958; 3,804,173; 4,005,749; 4,207,946; 3,797,574 and 3,778,399. These patents encompass a variety of sacrificial agents such as alkali metal carbonates and polyphosphates; low molecular weight water soluble polymeric viscosifiers; lignosulfonates and polybasic carboxylic acids. The use of these agents for the facilitation of bacterial cell injection into subterranean rock strata does not appear to be disclosed in the prior art.

Since it is recognized that significant amounts of surfactant and/or polymer are "lost" by rock adsorption in enhanced oil recovery operations, it is contemplated that such previously surfactantflooded and/or polymerflooded reservoirs are amenable to bacterial cell injection because a significant proportion of the rock adsorption sites would be occupied by surfactant and/or polymeric species. This adsorption gradient would be expected to facilitate the in depth penetration of the subsequently injected bacterial cells.

Accordingly, an object of this invention is to provide an improved process for the recovery of oil from subterranean oil reservoirs.

A further object of this invention is to provide an improved process for the post-primary or enhanced recovery of oil from subterranean formations.

A further object of this invention is to provide an improved process for the utilization of microbial cells in recovery of hydrocarbons from subterranean formations.

Other objects, aspects, as well as the several advantages of the invention will be apparent to those skilled in the art upon reading the specification and the appended claims.

SUMMARY OF THE INVENTION

In accordance with the invention a subterranean oil reservoir is treated near an injection well with a sacrificial agent to prevent adsorption of subsequently injected microbial or bacterial cells on rock near the injection well.

More specifically the invention relates to a process for producing petroleum from subterranean formations having injection and production wells in communication therewith comprising injecting into the formation via an injection well sacrificial agents, such as inorganic salts, polymeric viscosifiers, lignosulfonates, polybasic carboxylic acids, and the like, and subsequently or simultaneously injecting microbial or bacterial cells in an amount sufficient and under conditions to produce metabolic products such as carbon dioxide, carboxylic acids, and the like, which are potentially useful to increase post-primary, oil recovery by enhancing oil displacement from the subterranean formation to the surface of the earth.

In accordance with the invention, it has been found that sacrificial agents are strongly adsorbed on reservoir rock surfaces to establish an adsorption gradient, thereby facilitating the subsequent transport of less-highly adsorptive microbial cells to a site deep in the formation, i.e., at the "distal end" of the previously mentioned adsorption gradient.

DETAILED DESCRIPTION OF THE INVENTION

The present invention is carried out utilizing spaced injection and production wells in communication with a subterranean oil reservoir. The injection and production wells can be located and spaced from one another in any desired arrangement. In carrying out the invention, at least one sacrificial agent is introduced into the reservoir prior to injection of microbial or bacterial cells in an amount sufficient to significantly reduce the availability of adsorption sites for the subsequently introduced microbial cells.

A sacrificial agent is injected according to the invention through an injection means comprising one or more injection wells into a subterranean petroleum containing formation to occupy or cover all potential adsorption sites of the rock within the subterranean formation thereby reducing the extent of adsorption of the microbial cells or agents injected therebehind. The sacrificial agent performs best when it exhibits high adsorption on active sites of rock surfaces and thus diminishes microbial cell adsorption. Active adsorption sites on the formation rock refer to those areas of rock surfaces capable of adsorbing a material from a solution on contact.

It is within the scope of the invention to use any sacrificial agent which exhibits high adsorption on active sites of rock surfaces. Suitable sacrificial agents include inorganic salts, such as alkali metal carbonates and polyphosphates, e.g., sodium carbonate and sodium polyphosphate, lignosulfonates, e.g., sodium lignosulfonate, polymeric viscosifiers, such as polyacrylamides, as well as a number of other known materials such as disclosed in U.S. patents referred to hereinbefore.

The amount of sacrificial agent employed can vary somewhat depending upon the desired extent of penetration into the formation desired and the depth desired for penetration of the subsequently introduced microbial cells.

In actual operation, the amount of sacrificial agent injected into the reservoir can be an amount up to and including that required to occupy all of the active sites of the formation matrix. If less than the maximum amount is used, there will be a corresponding increase in the adsorption of microbial cells from the injected solution containing same onto the formation matrix although the amount of increase will not be as in the case where the formation is completely free of the sacrificial agent. The upper concentration limit is the amount of sacrificial agent needed to occupy the active sites on a formation matrix. The detriment resulting from using excess sacrificial agent would be an increase in cost of operating the oil recovery program. The amount of sacrificial agents, such as inorganic salts, carboxylic acids, polymeric viscosifiers, lignosulfonates, and the like, needed in the process of this invention depends on the particular formation, the area or pattern to be swept, and other formation characteristics. Those skilled in the art can determine the exact quantity needed to afford the desired amount of protection. Generally, it has been found that the sacrificial agent in the solution slug injected into the formation will be effective in a concentration of from about 0.01 to about 10 percent by weight of the total solution while an effective volume of these materials will range from about 0.01 to about 1 pore volume of the aqueous solution containing the sacrificial agent.

As indicated hereinbefore, microorganisms are injected into the formation following treatment of the subterranean formation with a sacrificial agent. A medium containing the microorganisms can be introduced into a subterranean formation immediately following injection of sacrificial agent or after the formation has been contacted with an aqueous solution following injection of the sacrificial agent. Thus, in actual practice, the formation can be treated sequentially by the steps of:

(1) contacting of the formation with a solution containing sacrificial agent, (2) contacting the thus treated formation with an aqueous solution, (3) introducing a solution containing a microorganism, preferably an aqueous, and more preferably an isotonic saline suspension, (4) introducing additional aqueous medium, e.g., an isotonic saline solution, (5) introducing the same or a different microorganism in an aqueous suspension, and (6) Further introducing an aqueous medium, preferably an isotonic saline solution.

The subterranean formation can be treated with the microorganisms by any procedure found most convenient and the invention is not limited to any particular method of introduction. The microorganism cultures can be introduced into formations with brine or water which is being injected into a subterranean formation for the purpose of a water drive.

The type of nutrient medium employed with the microorganisms will vary with the type or types of microorganisms being handled as is well known in the microbiological art. A mineral salt type medium is usually used.

The amount of microorganism introduced into the formation will depend upon the results desired. Anyone skilled in the art can determine the amount needed to provide the enhanced recovery desired.

The term "microbial cells" as used herein is intended to include bacteria, related microorganisms such as actinomycetes and fungi, and enzymes.

After introduction of the microbial cells or agents deep into the formation, the formation can be shut in for a sufficient period of time to allow the microbial cells to produce metabolic products, such as carbon dioxide, carboxylic acid and the like. After sufficient time is past to allow formation of the desired products, the formation can be subjected to the introduction of a drive fluid or other post-primary means for displacing the oil from the formation to the surface through a production well.

The potential of this invention ior positioning microorganisms deep within a porous media such as formation rock in oil reservoirs is demonstrated by the following laboratory runs which are presented for the purpose of illustration and are not intended to limit the scope of the invention as defined in the claims.

The following examples substantiate the operability of the present invention.

Berea sandstone cores which had been oilflooded and then water flooded to residual oil saturation were used in all the experimental work. The Berea cores were treated with the sacrificial agent prior to the injection of the bacterial cells. This was a screening procedure and no attempt was made to optimize the effect of the sacrificial agent in regard to concentration or pH effects.

The usual injection sequence was (a) sacrifical agent solution, (b) saline solution, (c) bacterial cell suspension, and (d) saline solution. Bacterial counts were made by plate count on aliquots of the effluent solution. At the conclusion of each experiment, bacterial cells were still flowing through the core so the improvement in cell passage is only relative and not absolute. In addition, no quantitative determination of the death of cells within the core could be made. Only viable cells were counted in the core effluent which may have been a small fraction of the total number of cells (both viable and nonviable) which passed through the core.

In the following examples, the bacterial cells were suspended in a salt solution containing a small amount of peptone. This type of composition exhibited a stabilized cell count for several hours. Since there was no technique to determine the fate of the cells in the core, the cell count could have increased or decreased relative to the total number of cells injected. The sacrificial agent probably had no effect on the cell count so the change of cell number in the control cores (no sacrificial agent) should have paralleled the cell count change in the experimental cores.

EXAMPLE I

This example used a commercially available partially hydrolyzed polyacrylamide (mol. wt. ca. one million) as the sacrifical agent (aqueous solution 500 ppm polymer). All experimental saline solutions were 0.85% sodium chloride. The waterflooded residual oil saturated Berea sandstone control core was treated sequentially with:
(a) one pore volume of saline solution
(b) one pore volume of *Serratia marcescens* saline suspension
(c) five pore volumes of saline solution
(d) one pore volume of *Escherichia coli* saline suspension
The salt solutions passing through the control core after cell introduction were plated for cell count: *S. marcescens* was determined by the red pigmentation of the colonies; *E. coli* was plated on EMB agar and only the typical *E. coli* colonies were counted. Flow rate through the core was equivalent to one foot per day.

In the *control core*, $2.48 \times 10^8$ cells of *S. marcescens* were introduced and $4.69 \times 10^4$ cells passed through. With *E. coli* a sample of $3.5 \times 10^8$ cells were introduced and no cells were detectable in the core effluent.

In the invention core, the Berea sandstore core was treated sequentially with:
(a) one pore volume of polyacrylamide (500 ppm) solution
(b) one pore volume of saline solution
(c) one pore volume of *Serratia marcescens* saline suspension
(d) five pore volumes of saline solution
(e) one pore volume of *Escherichia coli* saline suspension
(f) five pore volumes of saline solution
The injected samples of *Serratia marcescens* contained $2.48 \times 10^8$ cells: the untreated Berea sandstone core permitted the passage of $4.69 \times 10^4$ cells whereas the treated core permitted the passage of $2.94 \times 10^7$ cells. This represents about a 62686% improvement in the ability of the polyacrylamide treated core to pass cells relative to the untreated core's capacity to allow the passage of bacterial cells.

The injected samples of *Escherichia coli* contained $3.5 \times 10^8$ cells: the untreated Berea sandstone core did not permit the passage of a detectable quantity of cells whereas the polyacrylamide treated core permitted the passage of $2.15 \times 10^6$ cells. This represents an infinite improvement in the capacity of the treated core to pass cells relative to the capacity of the untreated core to allow the passage of bacterial cells.

In an additional run with the polyacrylamide sacrificial agent similar results were obtained. In this run the injection sequence was changed to: one pore volume of aqueous polyacrylamide (500 ppm), one pore volume of saline solution, one pore volume of a saline suspension of *Serratia marcescens* cells and ten pore volumes of saline solution. The injected samples of *S. marcescens* contained $4.5 \times 10^9$ cells: the untreated Berea sandstone core permitted the passage of $4.2 \times 10^4$ cells whereas the treated core permitted the passage of $5.45 \times 10^7$ cells. This represents a 129762% improvement in the capacity of the polyacrylamide treated core to pass cells relative to the capacity of the untreated core to pass bacterial cells.

EXAMPLE II

In this example, a saline solution which was 0.1 weight percent in sodium carbonate and 0.2 weight percent in sodium polyphosphate was used as the sacrificial agent. The injection sequence in this experiment was one pore volume of the carbonate/polyphosphate solution, one pore volume of saline solution, one pore volume of a saline suspension of *Serratia marcescens* bacterial cells and five pore volumes of saline solution. The injected samples of *S. marcescens* contained $4.73 \times 10^9$ cells: the untreated Berea sandstone core permitted the passage of $1.28 \times 10^4$ cells whereas the treated core permitted the passage of $1.22 \times 10^5$ cells. This represents about a 953% improvement in regard to the treated core's ability to pass bacterial cells compared to the capacity of the untreated core.

EXAMPLE III

The example procedure in this run was the same as that used in Example II. An aqueous solution of a xanthan biopolysaccharide was used as the sacrificial agent and cells of *Serratia marcescens* were injected into the Berea cores. The injected samples of *S. marcescens* contained $3.43 \times 10^9$ cells: the untreated Berea sandstone core permitted the passage of $8.6 \times 10^4$ cells whereas the treated core permitted the passage of $7.9 \times 10^5$ cells. This represents about a 918% improvement in the capacity of the xanthan treated core to pass cells relative to the untreated core's capacity to pass bacterial cells.

EXAMPLE IV

The example procedure in this example was essentially the same as that of Example II except for the use of a ten pore volume slug of saline solution in the injection sequence rather than a five pore volume slug. Aqueous 1 weight percent ammonium lignosulfonate was sacrificial agent. The injected samples of *Serratia marcescens* contained $7.75 \times 10^8$ cells: the untreated Berea sandstone core permitted the passage of $3.75 \times 10^4$ cells whereas the treated core permitted the passage of $3.2 \times 10^5$ cells. This represents about an 853% improvement in regard to the core's capacity to pass bacterial cells after the ammonium lignosulfonate treatment.

EXAMPLE V

The example procedure in this example was the same as that used in Example II. An aqueous solution of guar gum was used as the sacrificial agent. Injected samples of *Serratia marcescens* contained $1.89 \times 10^9$ cells: the untreated core permitted the passage of $8.79 \times 10^4$ cells whereas the guar gum treated core permitted the passage of $3.25 \times 10^5$ cells. This represents about a 370% improvement in the capacity of the treated core to pass cells relative to the untreated core's capacity to allow passage of bacterial cells.

That which is claimed is:

1. A method for recovering oil from a subterranean formation contining oil and having at least one injection and at least one production well comprising:
  (a) injecting through at least one injection well into the formation of established production at least one sacrificial agent in an amount sufficient to adsorb on and occupy active sites of the formation matrix and thereby diminish microbial cell adsorption on said formation matrix, (b) subsequently injecting into the formation via at least one injection well microbial cells which produce metabolic products in situ effective for enhancing oil displacement from the formation, and (c) producing oil in an enhanced recovery from at least one production well.

2. The method of claim 1 wherein step (b) is followed by injection of a drive fluid.

3. A method for recovering oil from a oil-bearing formation penetrated by at least one injection and production wells which comprises:

(a) first injecting into the formation of established production at least one sacrificial agent selected from inorganic salts, water soluble polymeric viscosifiers, lignosulfonates and polybasic carboxylic acids in an amount sufficient to adsorb on and occupy active sites of the formation matrix and thereby diminish the adsorption on said formation matrix of subsequently introduced materials, (b) subsequently introducing into the formation via injection wells a fluid containing microbial cells which produce metabolic products in situ, such as carbon dioxide, carboxylic acid, and the like, which metabolic products are effective for enhancing oil displacement from the formation, and (c) producing oil in an enhanced recovery from the formation via production wells.

4. A method according to claim 3 wherein the formation is shut in after introduction of said microbial cells to allow formation of said metabolic products prior to introduction of a drive fluid into the formation.

5. A method according to claim 3 wherein the sacrificial agent is one of ammonium lignosulfonate, polyacrylamide, alkali metal carbonates and polyphosphates, xanthan biopolysaccharide, and guar gum.

6. A method according to claim 3 wherein the sacrificial agent is a water soluble polymeric viscosifier.

7. A method according to claim 3 wherein said sacrificial agent is an inorganic salt.

8. A method according to claim 7 wherein said inorganic salt is one of water soluble carbonates and alkali metal polyphosphates.

9. A method according to claim 3 wherein a slug of a saline solution is injected into the formation following injection of sacrificial agent in step (a) and prior to injection of microbial cells in step (b).

10. A method according to claim 3 wherein a slug of a saline solution is injected into the formation following step (b) and prior to step (c).

11. A method according to claim 10 wherein injection of said slug is followed by injection of an aqueous suspension containing microbial cells which can be the same or different cells from those injected in step (b) which, in turn, is followed by injection of another slug of a saline solution.

12. A method for recovering natural fluids from a subterranean reservoir penetrated by injection and production wells which comprises:

(b) stopping production of the natural fluids, (b) injecting into a reservoir of established production of natural fluids via an injection well a sacrificial agent in an amount sufficient to adsorb on and occupy active sites of the formation matrix to diminish adsorption on the formation matrix of subsequently introduced materials, (c) introducing into the formation via an injection well a fluid containing microbial cells which produce metabolic products in situ, (d) allowing sufficient time for the microbial cells introduced into the formation to produce metabolic products such as carbon dioxide, carboxylic acids, and the like, and (e) returning the well to production to recover an enhanced production of natural fluids.

13. A method according to claim 12 wherein a drive fluid is injected into said formation through an injection well to return the well to production.

14. A method according to claim 12 wherein a slug of a saline solution is injected into the formation prior to and subsequent to injection of microbial cells in step (c).

* * * * *